(12) United States Patent
Winchester (10) Patent No.: US 9,734,637 B2
(45) Date of Patent: Aug. 15, 2017

(54) SEMANTIC RIGGING OF AVATARS

(75) Inventor: Royal D. Winchester, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 608 days.

(21) Appl. No.: 12/960,898

(22) Filed: Dec. 6, 2010

(65) Prior Publication Data

US 2012/0139899 A1 Jun. 7, 2012

(51) Int. Cl.
*G06T 19/20* (2011.01)
*G06T 17/20* (2006.01)

(52) U.S. Cl.
CPC .............. *G06T 19/20* (2013.01); *G06T 17/20* (2013.01); *G06T 2210/52* (2013.01); *G06T 2219/2021* (2013.01)

(58) Field of Classification Search
CPC ......... G06T 17/20; G06T 19/20; G06T 15/04; G06T 17/00; H04L 63/10; H04L 63/08; H04L 63/02; H04L 63/0428; H04L 51/36; A61M 25/0158; A61M 1/0049; A61M 25/06; A61M 39/22
USPC ................................................ 345/419, 473
See application file for complete search history.

(56) References Cited

U.S. PATENT DOCUMENTS

| | | | |
|---|---|---|---|
| 6,894,686 B2 * | 5/2005 | Stamper et al. | 345/419 |
| 8,139,067 B2 | 3/2012 | Anguelov et al. | |
| 2006/0210045 A1 | 9/2006 | Valliath et al. | |
| 2007/0035541 A1 * | 2/2007 | Isner | G06T 17/20 345/420 |
| 2007/0276667 A1 * | 11/2007 | Atkin et al. | 704/260 |
| 2008/0252637 A1 | 10/2008 | Berndt et al. | |
| 2008/0294721 A1 | 11/2008 | Berndt et al. | |
| 2009/0295793 A1 * | 12/2009 | Taylor et al. | 345/419 |
| 2010/0134490 A1 * | 6/2010 | Corazza et al. | 345/420 |
| 2011/0098113 A1 * | 4/2011 | Lanciault et al. | 463/32 |
| 2011/0109617 A1 * | 5/2011 | Snook et al. | 345/419 |

(Continued)

OTHER PUBLICATIONS

Kantonen, et al., "Mixed Reality in Virtual World Teleconferencing", Retrieved at <<http://virtual.vtt.fi/virtual/proj2/multimedia/publications/kantonen-2010.pdf>>, Virtual Reality Conference (VR), 2010 IEEE, Mar. 20, 2010, pp. 179-182.

(Continued)

*Primary Examiner* — Kimbinh T Nguyen
(74) *Attorney, Agent, or Firm* — Wade IP Law LLC (57) ABSTRACT

Techniques are described herein that are capable of generating a virtual rig for animation of a virtual 3D representation (e.g., an avatar) of an object. Semantic identifiers are associated with vertices of the virtual 3D representation. Each of the semantic identifiers specifies a respective feature of the object. The virtual rig is generated based on association of the semantic identifiers with the respective vertices. The virtual rig is capable of maneuvering the mesh to multiple configurations to animate the virtual 3D representation. In an example, the semantic identifiers may be used to generate and/or place virtual items in combination with the mesh. In another example, the semantic identifiers may be used to define reference elements. The reference elements serve as references for maneuvering respective portions of the mesh and/or virtual items that are associated with those portions.

20 Claims, 8 Drawing Sheets

(56) References Cited

U.S. PATENT DOCUMENTS

2013/0038601 A1* 2/2013 Han et al. .................. 345/419

OTHER PUBLICATIONS

Sato, et al., "Human Face Image Creation for Virtual Space Teleconferencing using Camera Input Images", Retrieved at <<http://www.mva-org.jp/Proceedings/CommemorativeDVD/2000/papers/2000375.pdf >>, IAPR Workshop on Machine Vision Application, Nov. 28, 2000, pp. 375-378.
Colburn, et al., "The Role of Eye Gaze in Avatar Mediated Conversational Interfaces", Retrieved at <<http://research.microsoft.com/pubs/69800/tr-2000-81.pdf.>>, Jul. 31, 2000, pp. 10.
Chat, Jinxiang, "Exploiting Spatial-temporal Constraints for Interactive Animation Control", Retrieved at <<http://www.cs.cmu.edu/~jchai/thesis/abstact-intro-conclusion.pdf >>, Aug. 5, 2006, pp. 20.
Weik, et al., "Automatic Creation of Flexible Antropomorphic Models for 3D Videoconferencing", Retrieved at <<http://citeseerx.ist.psu.edu/viewdoc/download?doi=10.1.1.53.6874&rep=rep1&type=pdf >>,1998, pp. 8.
"Face Robot—What is That?", Retrieved at <<http://softimage.wiki.softimage.com/index.php/Face_Robot_-_What_is_That%F >>, Aug. 6, 2009, pp. 8.

* cited by examiner

SEMANTIC RIGGING OF AVATARS

BACKGROUND OF THE INVENTION

Field of the Invention

The present invention generally relates to rigging of avatars.

Background

An avatar is a virtual representation of an object, such as a person. The avatar can be a two-dimensional representation or a three-dimensional representation of the object. Avatars that are three-dimensional representations of objects typically include meshes that represent surfaces of the objects. For instance, the meshes may include contours that depict three-dimensional aspects of the objects. A mesh is often generated at the direction of a human designer. Traditionally, the designer manually generates virtual items, such as eyeballs, and manually associates the virtual items with the mesh to generate an avatar.

An avatar may be animated, for example, by manipulating the mesh of the avatar using a virtual device that is referred to as a virtual rig. A virtual rig usually includes a collection of inter-related reference points that correspond to portions of the mesh. The virtual rig changes the relationships between the interconnected reference points to manipulate the mesh. Each manipulation of the mesh corresponds to a respective configuration of the avatar. Configurations of the avatar often are depicted using sequential virtual snapshots that represent respective physical configurations of the corresponding object. For example, configurations of an avatar that represents a video conference participant may illustrate movements (e.g., eye, lip, head, and arm movements) of the participant during the video conference. In accordance with this example, the configurations may be communicated to other participants of the video conference.

Conventional techniques for rigging an avatar involve manually associating reference points of the avatar's virtual rig to vertices of the avatar's mesh and to virtual items that are associated with the mesh. For example, a reference point, such as an eye bone, of a virtual rig may be manually associated with vertices that correspond to a virtual eyeball to enable the virtual rig to maneuver the virtual eyeball and/or a virtual eyelid that corresponds to the virtual eyeball. Manual association of mesh vertices, virtual items, and/or virtual rig reference points may be labor intensive and/or time consuming. Moreover, such manual association requires services of a human designer.

BRIEF SUMMARY OF THE INVENTION

Various approaches are described herein for, among other things, generating a virtual rig for animation of a virtual three-dimensional representation (e.g., an avatar) of an object. Semantic identifiers are associated with vertices of the virtual 3D representation. Each of the semantic identifiers specifies a respective feature of the object. Examples of a feature include, but are not limited to, an inner corner of a left eye, an outer corner of a right eye, an end of a nose, a midpoint of an upper right eyelid, an end of a chin, a top of a head, a left corner of lips, etc.). The virtual rig is generated based on association of the semantic identifiers with the respective vertices. The virtual rig is capable of maneuvering the mesh to multiple configurations to animate the virtual 3D representation.

In an example, the semantic identifiers may be used to generate and/or place virtual items in combination with the mesh. Examples of a virtual item include, but are not limited to, a virtual eyeball, virtual hair, a virtual article of clothing, etc. In another example, the semantic identifiers may be used to define reference elements. The reference elements serve as references for maneuvering respective portions of the mesh and/or virtual items that are associated with those portions. The reference elements may be referred to as "bones". For instance, the virtual rig may use an eyelid reference element (a.k.a. an eyelid bone) to control the movement of a corresponding eyelid of the virtual 3D representation. The virtual rig may use a chin reference element (a.k.a. a chin bone) to control the movement of a chin of the virtual 3D representation, and so on.

An example method is described in which a mesh is received. The mesh includes vertices that provide a virtual three-dimensional representation of an object. The vertices define polygons that define a virtual three-dimensional representation of a surface of the object. Semantic identifiers are associated with the respective vertices. Each of the semantic identifiers specifies a respective feature of the object. A virtual rig is generated that is capable of maneuvering the mesh to multiple configurations, based on association of the semantic identifiers with the respective vertices, to animate the virtual three-dimensional representation of the object.

An example system is described that includes a semantic identifier module and a virtual rig module. The semantic identifier module is configured to associate semantic identifiers with respective vertices of a mesh. The mesh provides a virtual three-dimensional representation of an object. The vertices define polygons that define a virtual three-dimensional representation of a surface of the object. Each semantic identifier specifies a respective feature of the object. The virtual rig module is configured to generate a virtual rig that is capable of maneuvering the mesh to configurations, based on association of the semantic identifiers with the respective vertices, to animate the virtual three-dimensional representation of the object.

An example computer program product is described that includes a computer-readable medium having computer program logic recorded thereon for generating a virtual rig to animate a virtual three-dimensional representation of a human head. The computer program product includes first, second, third, and fourth program logic modules. The first program logic module is for enabling the processor-based system to associate semantic identifiers with respective vertices of a mesh. The mesh provides a virtual three-dimensional representation of a human head. The vertices define polygons that define a virtual three-dimensional representation of a face of the human head. Each semantic identifier specifies a respective feature of the human head. The second program logic module is for enabling the processor-based system to generate a virtual rig that is capable of maneuvering the mesh to multiple configurations, based on association of the semantic identifiers with the respective vertices, to animate the virtual three-dimensional representation of the human head. The third program logic module is for enabling the processor-based system to determine that first and second virtual eyeballs are to be combined with the mesh to represent corresponding first and second physical eyeballs of the human head based on respective first and second designated subsets of the semantic identifiers. The fourth program logic module is for enabling the processor-based system to generate the first and second virtual eyeballs based on respective first and second subsets of the vertices that are associated with the respective first and second designated subsets of the semantic identifiers.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of generating a virtual rig for animation of a virtual three-dimensional (3D) representation (e.g., an avatar) of an object. In accordance with the example embodiments, semantic identifiers are associated with vertices of the virtual 3D representation. Each of the semantic identifiers specifies a respective feature of the object. Examples of a feature include, but are not limited to, an inner corner of a left eye, an outer corner of a right eye, an end of a nose, a midpoint of an upper right eyelid, an end of a chin, a top of a head, a left corner of lips, etc. The virtual rig is generated based on association of the semantic identifiers with the respective vertices. The virtual rig is capable of maneuvering the mesh to multiple configurations to animate the virtual 3D representation.

In an example, the semantic identifiers may be used to generate and/or place virtual items in combination with the mesh. Examples of a virtual item include, but are not limited to, a virtual eyeball, virtual hair, a virtual article of clothing, etc. in another example, the semantic identifiers may be used to define reference elements. The reference elements serve as references for maneuvering respective portions of the mesh and/or virtual items that are associated with those portions. The reference elements may be referred to as "bones". For instance, the virtual rig may use an eyelid reference element (a.k.a. an eyelid bone) to control the movement of a corresponding eyelid of the virtual 3D representation. The virtual rig may use a chin reference element (a.k.a. a chin bone) to control the movement of a chin of the virtual 3D representation, and so on. Persons skilled in the relevant art(s) will recognize that the term "bone" is a term of art and does not necessarily correspond to an actual bone in the object.

The virtual rig may expose control functionality, such as by functions and/or APIs, to software application(s). The control functionality may enable the software application(s) to use the virtual rig to control animation of the virtual 3D representation.

Example techniques described herein have a variety of benefits as compared to conventional techniques for generating a virtual rig (a process also referred to as rigging) to animate an avatar of an object. For instance, semantic rigging of avatars can be performed automatically, such as by using software. As a result, semantic rigging of avatars need not necessarily use services of a human designer. Example techniques for semantic rigging are capable of procedurally placing virtual items and reference elements with respect to a mesh of an avatar. Example techniques may consume less time and/or be less expensive than conventional avatar rigging techniques.

Figure 1:
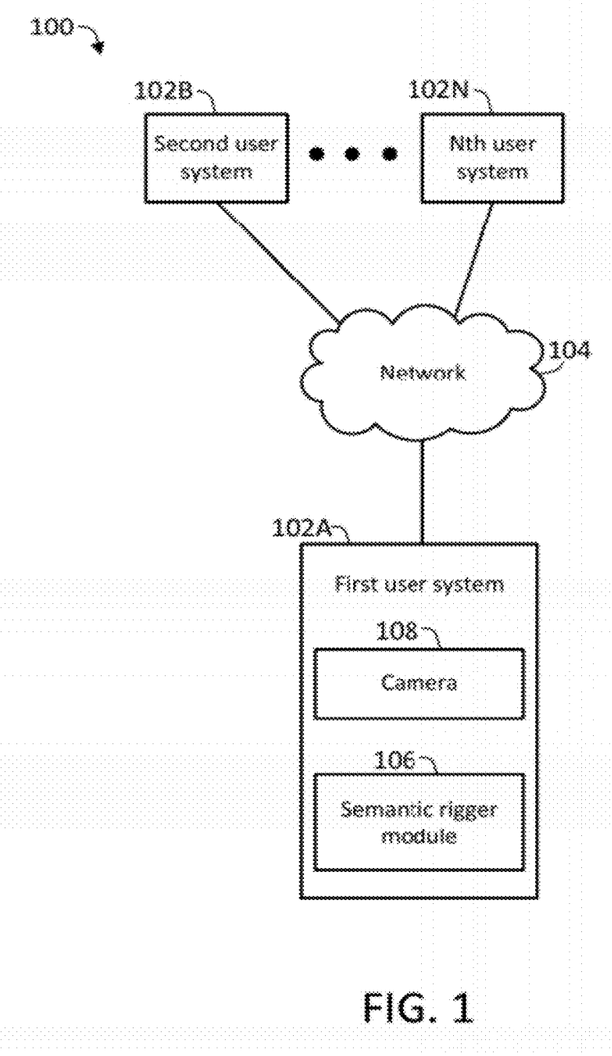
FIG. 1 is a block diagram of an example communication system that supports semantic rigging of avatars in accordance with an embodiment.

FIG. 1 is a block diagram of a communication system 100 that supports semantic rigging of avatars in accordance with an embodiment. Communication system 100 may be a videoconferencing system, a gaming system, or other suitable type of system. As shown in FIG. 1, communication system includes a plurality of user systems 102A-102N and a network 104. Communication among user systems 102A-102N is carried out over network 104 using well-known communication protocols. Network 104 may be a wide-area network (e.g., the Internet), a local area network (LAN), a wide area network (WAN), another type of network, or a combination thereof.

User systems 102A-102N are processing systems that are capable of generating and/or displaying a virtual three-dimensional (3D) representation of an object. An example of a processing system is a system that includes at least one processor that is capable of manipulating data in accordance with a set of instructions. For instance, each of user systems 102A-102N may be a personal computer, a personal digital assistant, etc. Any one or more of user systems 102A-102N may be configured to provide a virtual 3D representation of an object (e.g., a user of that user system) to any one or more of the other user systems. Any one or more of user systems 102A-102N may be configured to receive a virtual 3D representation of an object from any one or more of the other user systems.

As shown in FIG. 1, first user system 102A includes a semantic rigger module 106 and a camera 108. Camera 108 is configured to capture image(s) of an object, such as a user of first user system 102A. For instance, camera 108 may capture the image(s) in response to instructions that are included in software that is executed by first user system 102A. For example, camera 108 may capture the image(s) in accordance with a predetermined algorithm that is defined by the instructions. In another example, camera 108 may capture the image(s) in response to interaction of the user with a user interface that first user system 102A provides to the user. Camera provides the image(s) to semantic rigger module 106 for processing. Camera 108 need not necessarily be included in first user system 102A. For example, camera 108 may be external to first user system 102A. In another example, communication system 100 does not include camera 108.

Semantic rigger module 106 is configured to generate a virtual rig for animation of a virtual 3D representation (e.g., an avatar) of the object. Semantic rigger module 106 receives a mesh that defines a virtual 3D representation of a surface of the object. In particular, the mesh includes vertices that define polygons that define the virtual 3D representation of the surface of the object. It will be recognized that semantic rigger module 106 may generate or modify the mesh based on the image(s) that are received from camera 108, though the scope of the example embodiments is not limited in this respect. Semantic rigger module 106 associates semantic identifiers with the respective vertices of the mesh. The semantic identifiers specify respective features of the object. Semantic rigger module 106 generates the virtual rig based on association of the semantic identifiers with the respective vertices.

In accordance with some example embodiments, semantic rigger module 106 is configured to generate the avatar that represents the object. For example, semantic rigger module 106 may generate and/or place virtual items in combination with the mesh based on the semantic identifiers. In another example, semantic rigger module 106 may define reference elements based on the semantic identifiers. Virtual items and reference elements are discussed in greater detail below with reference the example avatars depicted in FIGS. 2A-2D.

Figure 2A:
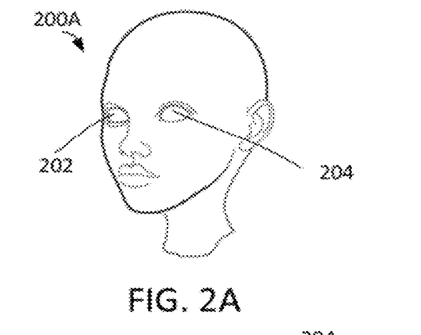
FIGS. 2A-2D depict example avatars in accordance with embodiments.

FIG. 2A depicts an example avatar 200A that represents a human head according to an embodiment. As shown in FIG. 2A, avatar 200A includes voids 202 and 204 where one or more virtual items, such as virtual eyeballs, may be placed. For instance, a first virtual eyeball may be placed in void 202, and a second virtual eyeball may be placed in void 204. An example technique for placing virtual items, such as virtual eyeballs, in an avatar is described below with reference to FIG. 2C.

Figure 2B:
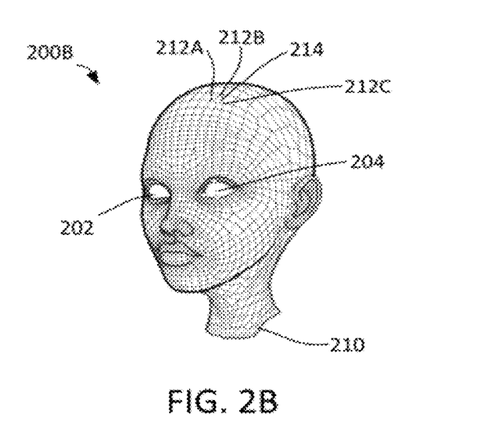

FIG. 2B depicts an example avatar 200B that includes a mesh 210 according to an embodiment. Mesh 210 includes a plurality of vertices, including vertices 212A-212C. The plurality of vertices defines a plurality of polygons. For example, vertices 212A-212C are shown to define polygon 214. Polygon 214 is defined to have a triangular shape based on the three vertices 212A-212C for illustrative purposes and is not intended to be limiting. It will be recognized that mesh 210 may include any suitable number of vertices that define any suitable number of polygons having any suitable respective shapes. Mesh 210 may include tens, hundreds, thousands, or more vertices that define tens, hundreds, thousands, or more polygons.

Figure 2C:
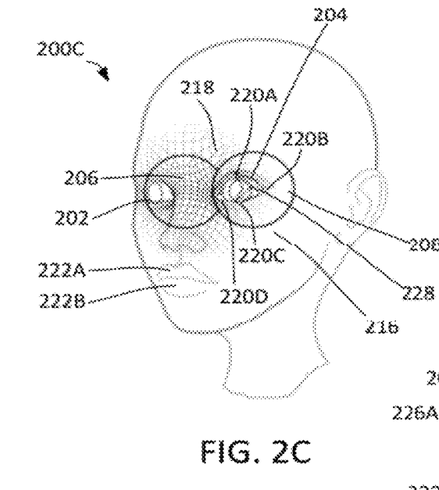

FIG. 2C depicts an example avatar 200C that includes virtual items 206 and 208 according to an embodiment. Virtual item 206 is placed in void 202, and virtual item 208 is placed in void 204. In accordance with example embodiments, the placement of virtual items with respect to a mesh is based on semantic identifiers that are associated with respective vertices of the mesh. For instance, the placement of virtual item 208 in void 204 is based on the association of vertices 220A-220D with respective semantic identifiers. For example, vertex 220A may be associated with a semantic identifier of "middle of left upper eyelid" to indicate that vertex 220A corresponds to the middle of the left upper eyelid of the human head that avatar 220C represents. Vertex 220B may be associated with a semantic identifier of "outer corner of left eye". Vertex 220C may be associated with a semantic identifier of "middle of left lower eyelid". Vertex 220D may be associated with a semantic identifier of "inner corner of left eye". In accordance with an example implementation, semantic rigger module 106 places virtual items 206 and 208 in voids 202 and 204.

Semantic identifiers, such as those mentioned above, may be used to define reference elements. For example, reference element 228 is defined based on the semantic identifiers of "middle of left upper eyelid", "outer corner of left eye", "middle of left lower eyelid", and "inner corner of left eye", which are associated with respective vertices 220A-220D. Reference element 228 serves as a reference for maneuvering a portion of the mesh that corresponds to the aforementioned semantic identifiers. For instance, the portion of the mesh for which reference element 228 serves as a reference may include any one or more of the left upper eyelid of the avatar, which includes vertex 220A, the left lower eyelid, which includes vertex 220B, the left cheek 216, the forehead 218, etc. It will be recognized that any number of reference identifiers may be used to define any number of reference elements. For instance, reference identifiers of "left corner of mouth", "right corner of mouth", "middle of upper lip", and "middle of lower lip" (or other suitable reference identifiers) may be used to define a reference element (not shown) for maneuvering a portion of the mesh that includes lips 222A-222B of the avatar 200C and the surrounding area. In accordance with an example implementation, semantic rigger module 106 defines reference elements, such as reference element 228, based on respective subsets of the semantic identifiers that are associated with the vertices of the mesh.

Figure 2D:
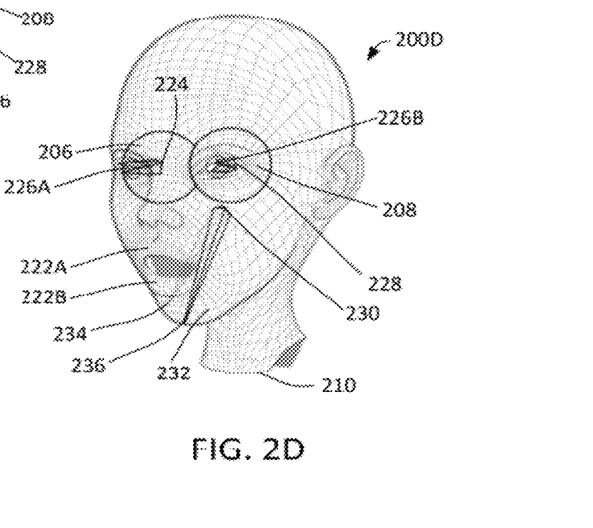

FIG. 2D shows an example avatar 200D that is animated using a virtual rig. It will be presumed that the virtual rig already has been generated (e.g., by semantic rigger module 106) for purposes of illustration. As shown in FIG. 2D, the virtual rig includes reference elements 224 and 228 for maneuvering respective virtual items 206 and 208 and corresponding portions of mesh 210. For example, right eye 226A and left eye 226B of the avatar 200D are shown to be in a squinted state. The virtual rig further includes reference element 230 for maneuvering a portion of mesh 210 that includes a chin 232 and lips 222A-222B of the avatar 200D. For example, a vertex that corresponds to the end of the chin 232 is shown in FIG. 2D to be moved from a first location 234 to a second location 236. In accordance with this example, the virtual rig maneuvers the lips 222A-222B of the avatar 200D, such that the mouth of the avatar 200D opens. In accordance with an example implementation, semantic rigger module 106 animates the avatar 200D using the virtual rig.

Figure 3:
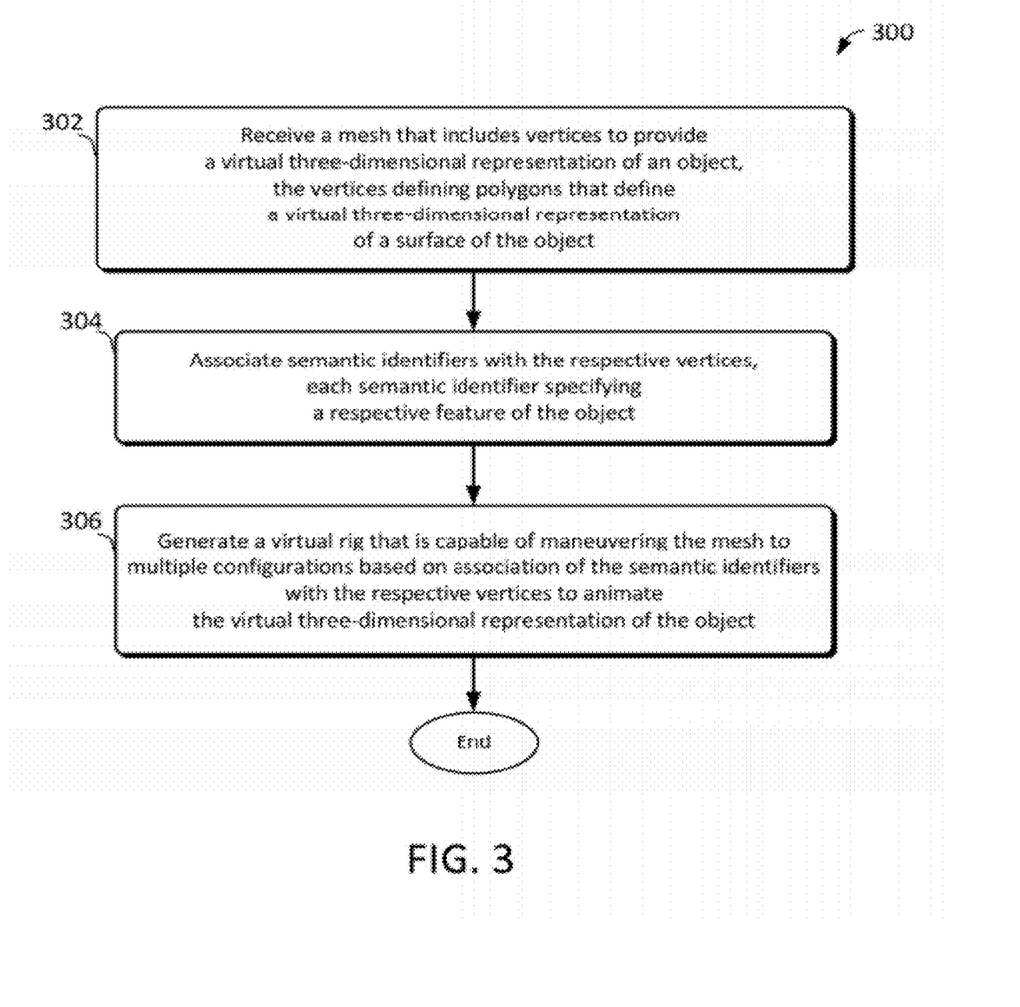
FIG. 3 depicts a flowchart of an example method for generating a virtual rig to animate a virtual three-dimensional representation of an object in accordance with an embodiment.
Figure 4:
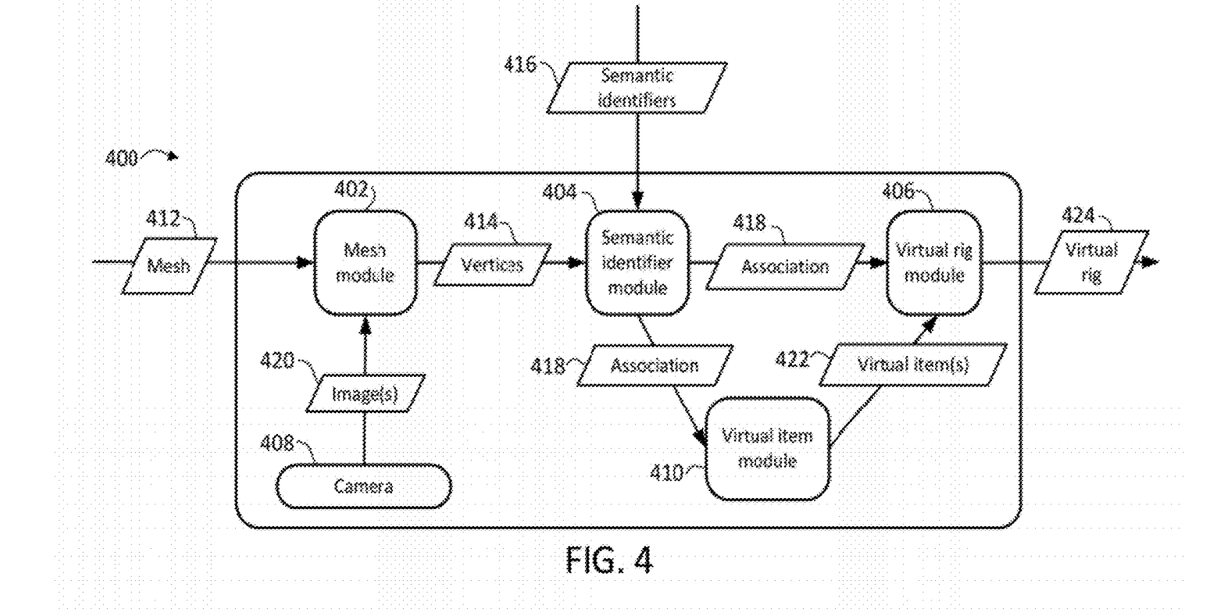
FIG. 4 is a block diagram of an example system for generating a virtual rig to animate a virtual three-dimensional representation of an object in accordance with an embodiment.

In example embodiments, avatars may be semantically generated in various ways. For instance, FIG. 3 depicts a flowchart 300 of an example method for generating a virtual rig to animate a virtual three-dimensional representation of an object in accordance with an embodiment. For illustrative purposes, flowchart 300 is described with respect to a semantic rigging module 400 shown in FIG. 4, which is an example of semantic rigging module 106, according to an embodiment. As shown in FIG. 4, semantic rigging module 400 includes a mesh module 402, a semantic identifier module 404, a virtual rig module 406, a camera 408, and a virtual item module 410. Further structural and operational embodiments will be apparent to persons skilled in the relevant art(s) based on the discussion regarding flowchart 300. Also, the method of flowchart 300 may be modified by those skilled in the art in order to derive alternative embodiment(s). Also, the steps may occur in a different order than shown; some steps may be performed concurrently; some steps may be combined with other steps; and/or some steps may be absent, as desired.

As shown in FIG. 3, flowchart 300 begins at step 302. In step 302, a mesh is received that includes vertices to provide a virtual three-dimensional (3D) representation of an object. The vertices define polygons that define a virtual 3D representation of a surface of the object. In an example implementation, mesh module 402 receives mesh 412 that includes vertices 414 to provide a virtual 3D representation of an object, such as from image(s) of the object that are received from camera 108 of FIG. 1. In accordance with this example implementation, mesh module 402 provides the vertices 414 to semantic identifier module 404.

At step 304, semantic identifiers are associated with the respective vertices. Each semantic identifier specifies a respective feature of the object. For example, the semantic identifiers may be automatically associated with the respective vertices. In an example implementation, semantic identifier module 404 associates semantic identifiers 416 with the respective vertices 414 that are received from mesh module 402 to provide association 418. Each of the semantic identifiers 416 specifies a respective feature of the object.

Figure 6:
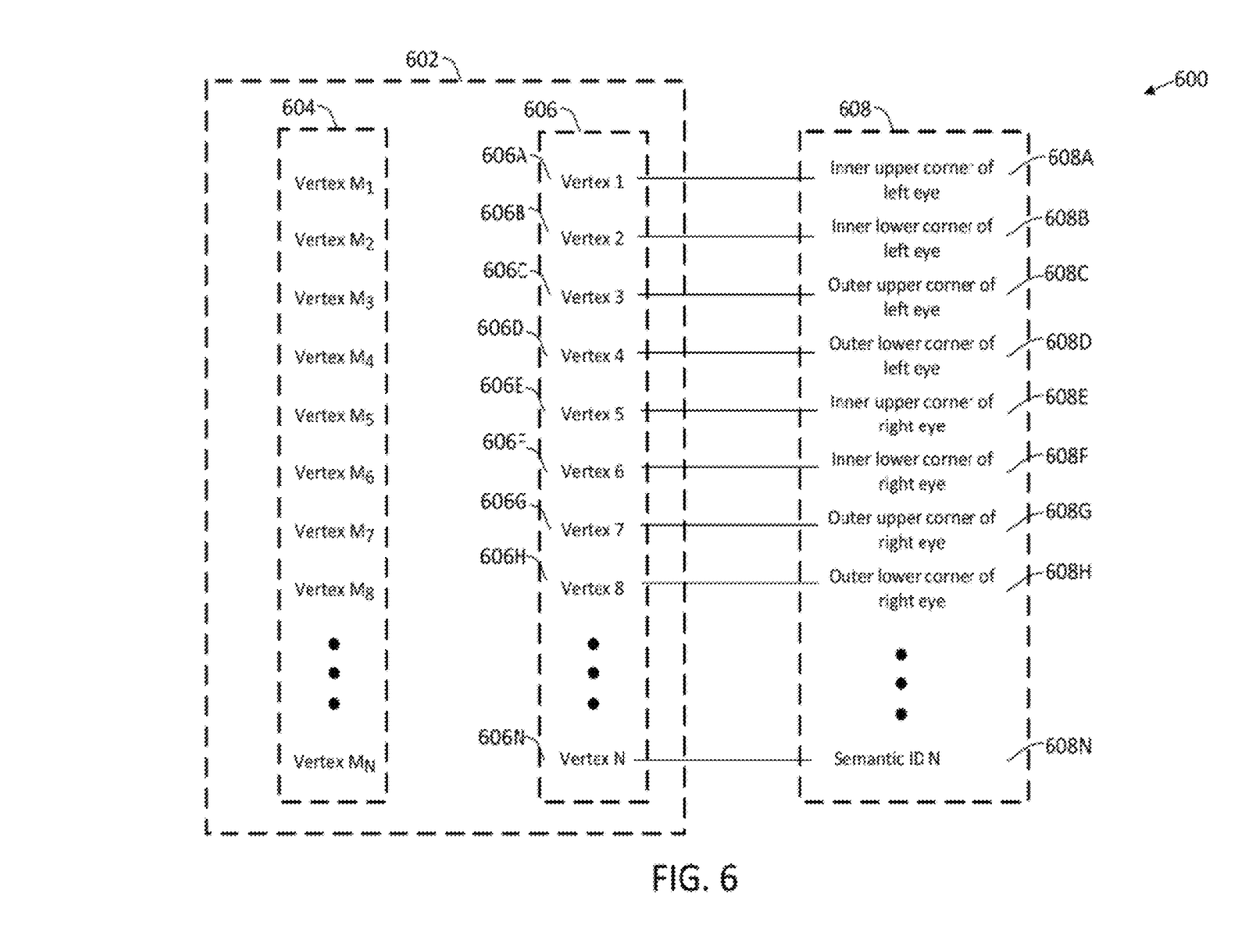
FIG. 6 illustrates an example association of semantic identifiers with respective vertices in accordance with an embodiment.

For instance, FIG. 6 shows an example association 600 of semantic identifiers 608 with respective vertices 606 in accordance with an embodiment. For purposes of illustration, it will be presumed that mesh 412 includes vertices 602, which include non-associated vertices 604 and associated vertices 606. Non-associated vertices 604 are vertices that are not associated with semantic identifiers. For example, non-associated vertices are not associated with semantic identifiers 608. Associated vertices 606 (i.e., vertices 606A-606N) are vertices that area associated with respective semantic identifiers 608 (i.e., semantic identifiers 608A-608N). Each of semantic identifiers 608A-608N specifies a respective feature of the object that is represented by mesh 412. For example, semantic identifier 608A specifies an inner upper corner of a left eye; semantic identifier 608B specifies an inner lower corner of the left eye; semantic identifier 608C specifies an outer upper corner of the left eye; semantic identifier 608D specifies an outer lower corner of the left eye; semantic identifier 608E specifies an inner upper corner of a right eye; semantic identifier 608F specifies an inner lower corner of the right eye; semantic identifier 608 G specifies an outer upper corner of the right eye; semantic identifier 608H specifies an outer lower corner of the right eye, etc.

Referring back to FIG. 3, at step 306, a virtual rig is generated that is capable of maneuvering the mesh to multiple configurations based on association of the semantic identifiers with the respective vertices to animate the 3D representation of the object. In an example implementation, virtual rig module 406 generates virtual rig 424, which is capable of maneuvering mesh 412 to multiple configurations, such as described above with reference to FIG. 2D, based on association 418. In an example embodiment, virtual rig module 406 automatically generates virtual rig 424.

Figure 5:
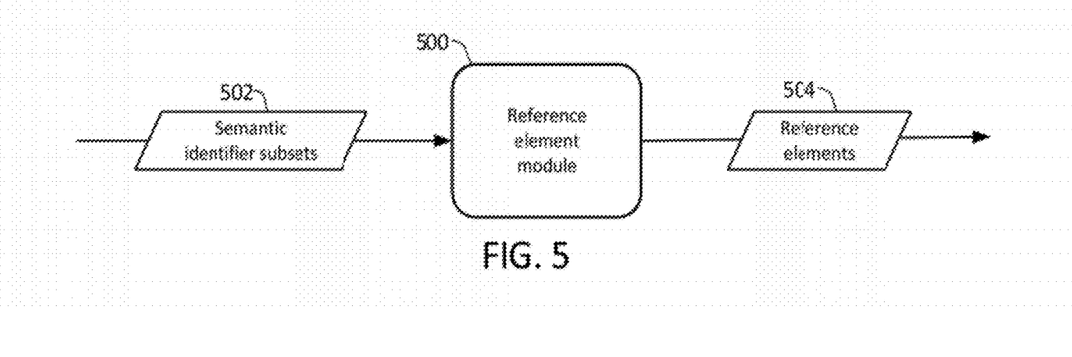
FIG. 5 is a block diagram of an example reference element module in accordance with an embodiment.
Figure 7:
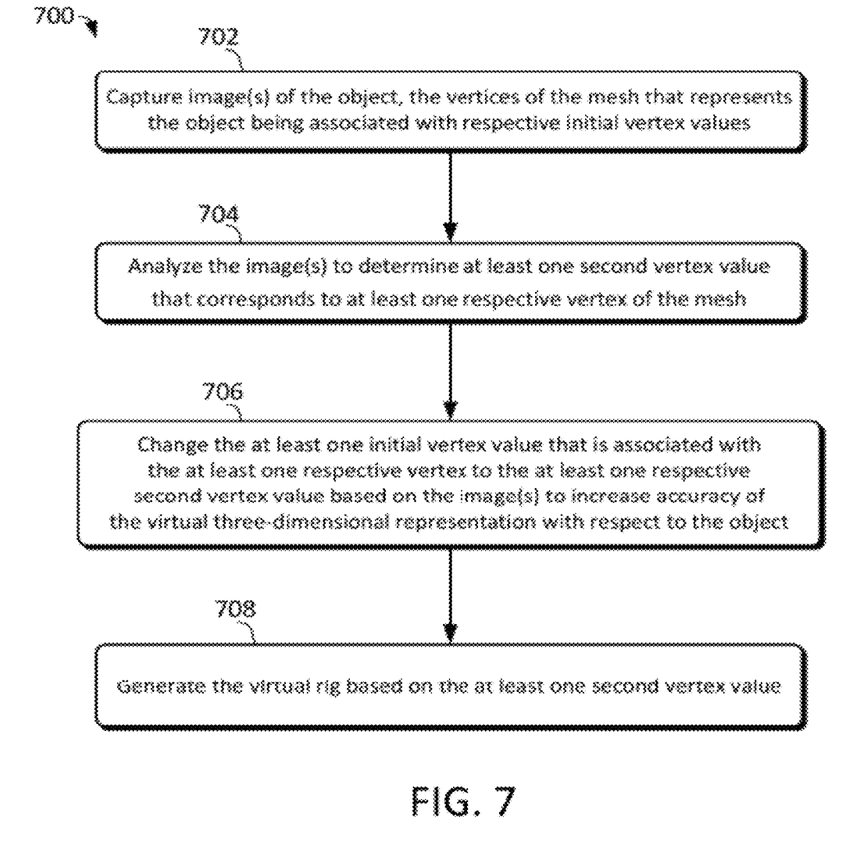
FIGS. 7-12 depict variations of the flowchart shown in FIG. 3 in accordance with embodiments.
Figure 8:
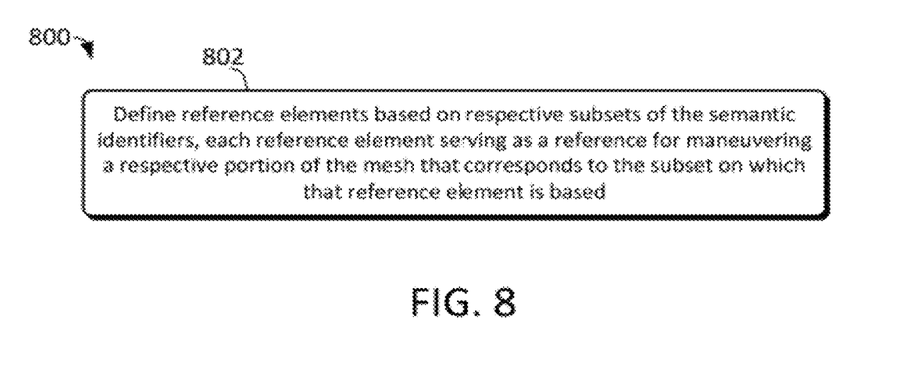
Figure 9:
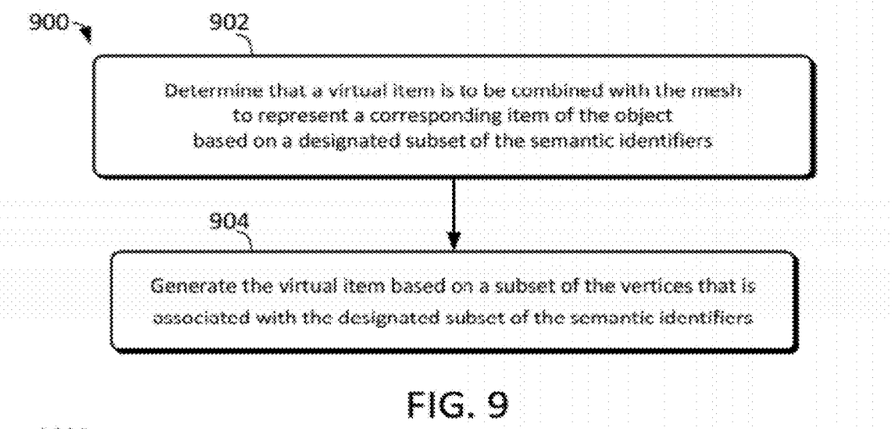
Figure 10:
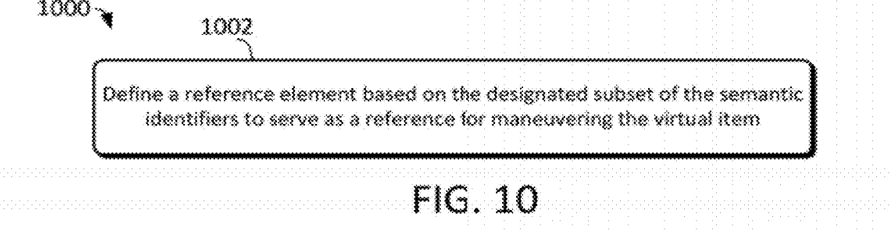
Figure 11:
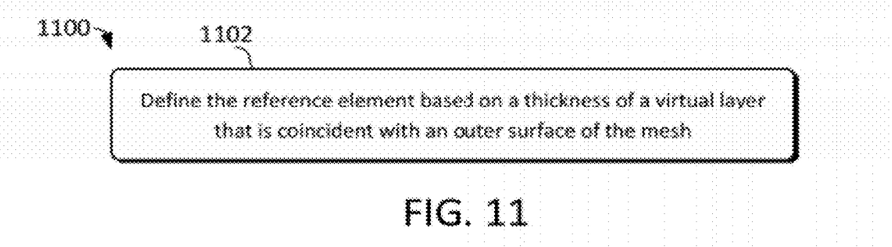
Figure 12:
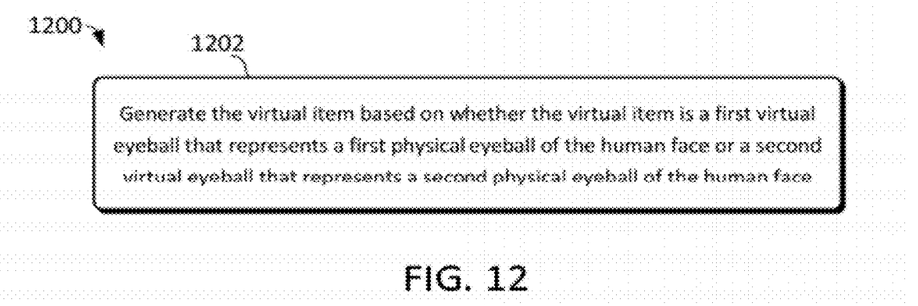

FIGS. 7-12 depict variations of the flowchart shown in FIG. 3 in accordance with embodiments. For illustrative purposes, flowcharts 700, 900, and 1200 of respective FIGS. 7, 9, and 12 are described with respect to semantic rigging module 400. Flowcharts 800, 1000, and 1100 are described with respect to a reference element module 500 shown in FIG. 5, which may be incorporated into virtual rig module 406 and/or virtual item module 410, according to embodiments. Further structural and operational embodiments will be apparent to persons skilled in the relevant art(s) based on the discussion regarding flowcharts 700, 800, 900, 1000, 1100, and 1200.

In an example embodiment, the steps shown in flowchart 700 of FIG. 7 are performed in addition to the steps shown in flowchart 300 of FIG. 3. As shown in FIG. 7, the method of flowchart 700 begins at step 702. In step 702, image(s) of the object are captured. The vertices of the mesh that represents the object are associated with respective initial vertex values. For example, the initial vertex values may be default values or previously determined values based on image(s) other than image(s) 420. In an example implementation, camera 408 captures image(s) 420 of the object. In accordance with this example implementation, camera 408 provides the image(s) 420 to mesh module 402 for analysis. For instance, camera 408 may provide the image(s) 420 via a communication network using any suitable protocol, such as an Institute of Electrical and Electronics Engineers (IEEE) 1394 protocol, a universal serial bus (USB) protocol, an Ethernet protocol, etc.

At step 704, the image is analyzed to determine at least one second vertex value that corresponds to at least one respective vertex of the mesh. In an example implementation, mesh module 402 analyzes the images(s) 420 to determine at least one second vertex value that corresponds to at least one respective vertex of mesh 412. For instance, mesh module 402 may use any of a variety of image processing techniques, such as facial recognition techniques, to determine the at least one second vertex value.

At step 706, the at least one initial vertex value that is associated with the at least one respective vertex is changed to the at least one respective second vertex value based on the image to increase accuracy of the virtual 3D representation with respect to the object. In an example implementation, mesh module 402 changes at least one initial vertex value that is associated with the at least one respective vertex of mesh 412 to the at least one respective second vertex value.

At step 708, the virtual rig is generated based on the at least one second vertex value. In an example implementation, virtual rig module 406 generates virtual rig 424 based on the at least one second vertex value of mesh 412.

In another example embodiment, step 306 of flowchart 300 in FIG. 3 includes the step shown in flowchart 800 of FIG. 8. As shown in FIG. 8, flowchart 800 includes step 802. At step 802, reference elements are defined based on respective subsets of the semantic identifiers. Each reference element serves as a reference for maneuvering a respective portion of the mesh that corresponds to the subset on which that reference element is based. In an example implementation, reference element module 500 defines reference elements 504 based on respective semantic identifier subsets 502. For example, referring back to FIG. 6, reference element module 500 may define a first reference element (e.g., a left eye bone) of reference elements 504 based on semantic identifiers 608A-608D. In accordance with this example, reference element module 500 may define a second reference element (e.g., aright eye bone) of reference elements 504 based on semantic identifiers 608E-608H.

In further accordance with this example, reference element module 500 may use vertex 606A, which is associated with semantic identifier 608A, vertex 606B, which is associated with semantic identifier 608B, vertex 606C, which is associated with semantic identifier 608C, and vertex 606D, which is associated with semantic identifier 608D, to define the first reference element. Reference element module 500 may use vertex 606E, which is associated with semantic identifier 608E, vertex 606F, which is associated with semantic identifier 608F, vertex 606G, which is associated with semantic identifier 608G, and vertex 606H, which is associated with semantic identifier 608H, to define the second reference element. For instance, reference element module 500 may determine a location and/or an orientation of each of the first and second reference elements with respect to the mesh 404 based on vertex values that are associated with the respective vertices 414.

In an example embodiment, virtual rig module 500 automatically creates supplementary reference element(s) that aid in determining locations and/or orientations of the respective reference elements 504. For example, virtual rig module 500 may modify an initial location and/or an initial orientation of a designated reference element based on such supplementary reference element(s) to provide a revised location and/or a revised orientation of the designated reference element.

In another example embodiment, reference elements 504 are arranged in hierarchy. For example, a virtual rig (e.g., virtual rig 424) may include a left eye bone, a right eye bone, a lip bone, and a head bone, etc. The left and right eye bones and the lip bone may be connected to the head bone, such that the head bone serves as a parent bone to the left and right eye bones and the lip bone. The virtual rig may have similar hierarchical arrangements for other portions of the avatar, such as arms, legs, etc., which all may be connected to a root spine bone, for example.

In accordance with this example, the left eye bone may serve as a reference for maneuvering a portion of the mesh that corresponds to a first subset of the semantic identifier subsets 502 (e.g., semantic identifiers 608A-608D of FIG. 6) on which the left eye bone is based. For instance, the left eye bone may serve as a reference for maneuvering a portion of the mesh that includes vertices 606A-606D, which are associated with semantic identifiers 608A-608D, and optionally one or more of the non-assigned vertices 604. The right eye bone may serve as a reference for maneuvering a portion of the mesh that corresponds to a second subset of the semantic identifier subsets 502 (e.g., semantic identifiers 608E-608H) on which the right eye bone is based, and so on.

In yet another example embodiment, the steps shown in flowchart 900 of FIG. 9 are performed in addition to the steps shown in flowchart 300 of FIG. 3. As shown in FIG. 9, the method of flowchart 900 begins at step 902. In step 902, a determination is made that a virtual item is to be combined with the mesh to represent a corresponding item of the object based on a designated subset of the semantic identifiers. In an example implementation, virtual item module 410 determines that a virtual item (e.g., a virtual left eyeball) is to be combined with mesh 412 to represent a corresponding item (e.g., a left eyeball) of the object. For example, virtual item module 410 may determine that the virtual item is to be combined with mesh 412 based on the image(s) 420 that are received from camera 408.

At step 904, the virtual item is generated based on a subset of the vertices that is associated with the designated subset of the semantic identifiers. In an example implementation, virtual item module 410 generates the virtual item (e.g., the virtual left eyeball), based on the subset of the vertices (e.g., vertices 606A-606D) that is associated with the designated subset of the semantic identifiers (e.g., semantic identifiers 608A-608D). For example, virtual item module 410 may determine that the subset of the vertices is associated with the designated subset of the semantic identifiers based on association 418. In accordance with this example, virtual item module 410 receives association 418 from semantic identifier module 404. Virtual item module 410 may include the virtual item in virtual item(s) 422, which virtual item module 410 provides to virtual rig module 406. Virtual item module 410 may determine a location and/or an orientation of the virtual item using any suitable technique.

In an example embodiment, step 904 of flowchart 900 in FIG. 9 includes step 1002 shown in flowchart 1000 of FIG. 10. At step 1002, a reference element is defined based on the designated subset of the semantic identifiers to serve as a reference for maneuvering the virtual item. In an example implementation, reference element module 500 defines a reference element of reference elements 504 based on a designated subset of semantic identifier subsets 502. In accordance with this example embodiment, virtual rig 424 may be capable of maneuvering the virtual item to multiple configurations based on the reference element to animate the 3D representation of the object. For instance, virtual rig 424 may provide control layer functionality to a user, such as a user of first user system 102A of FIG. 1. The control layer functionality of virtual rig 424 may include one or more software functions that the user may access, such as by using software running on first user system 102A. For example, a user may execute an application on first user system 102A that accesses the control layer functionality of virtual rig 424 to maneuver the virtual item.

In an example embodiment, step 1002 of flowchart 1000 in FIG. 10 includes step 1102 shown in flowchart 1100 of FIG. 11. At step 1102, the reference element is defined based on a thickness of a virtual layer that is coincident with an outer surface of the mesh. In an example implementation, reference element module 500 defines a reference element of reference elements 504 based on a thickness of a virtual layer (e.g., a virtual skin, a virtual coating, etc.) that is coincident with the outer surface of mesh 412. The virtual layer may be a virtual representation of a physical layer (e.g., a physical skin, a physical coating, etc.) that is coincident with an outer surface of the object.

In accordance with this example embodiment, reference element module 500 may determine a location and/or a position of the reference element based on the thickness of the virtual layer. For instance, if the object is a person, the virtual layer may represent the physical skin of the person. It will be recognized that the virtual layer may represent a physical layer that is coincident with any object. For instance, the object may be an inanimate object.

In another example embodiment, step 904 of flowchart 900 in FIG. 9 includes step 1202 shown in flowchart 1200 of FIG. 12. At step 1202, the virtual item is generated based on whether the virtual item is a first virtual eyeball that represents a first physical eyeball of the human face or a second virtual eyeball that represents a second physical eyeball of the human face. In an example implementation, virtual item module 410 generates the virtual item.

In accordance with this example embodiment, characteristic(s) of the first physical eyeball and respective characteristic(s) of the second physical eyeball are asymmetric with respect to the human face. Virtual item module 410 is capable of generating the first virtual eyeball and the second virtual eyeball such that characteristic(s) of the first virtual eyeball and respective characteristic(s) of the second virtual eyeball are asymmetric to represent the aforementioned asymmetry between the characteristic(s) of the first physical eyeball and the characteristic(s) of the second virtual eyeball. Examples of a characteristic include a position, a size, a shape, etc.

Semantic rigger module 106, mesh module 402, semantic identifier module 404, virtual rig module 406, virtual item module 410, and reference element module 500 may be implemented in hardware, software, firmware, or any combination thereof. For example, semantic rigger module 106, mesh module 402, semantic identifier module 404, virtual rig module 406, virtual item module 410, and/or reference element module 500 may be implemented as computer program code configured to be executed in one or more processors. In another example, semantic rigger module 106, mesh module 102, semantic identifier module 404, virtual rig module 406, virtual item module 410, and/or reference element module 500 may be implemented as hardware logic/electrical circuitry.

Figure 13:
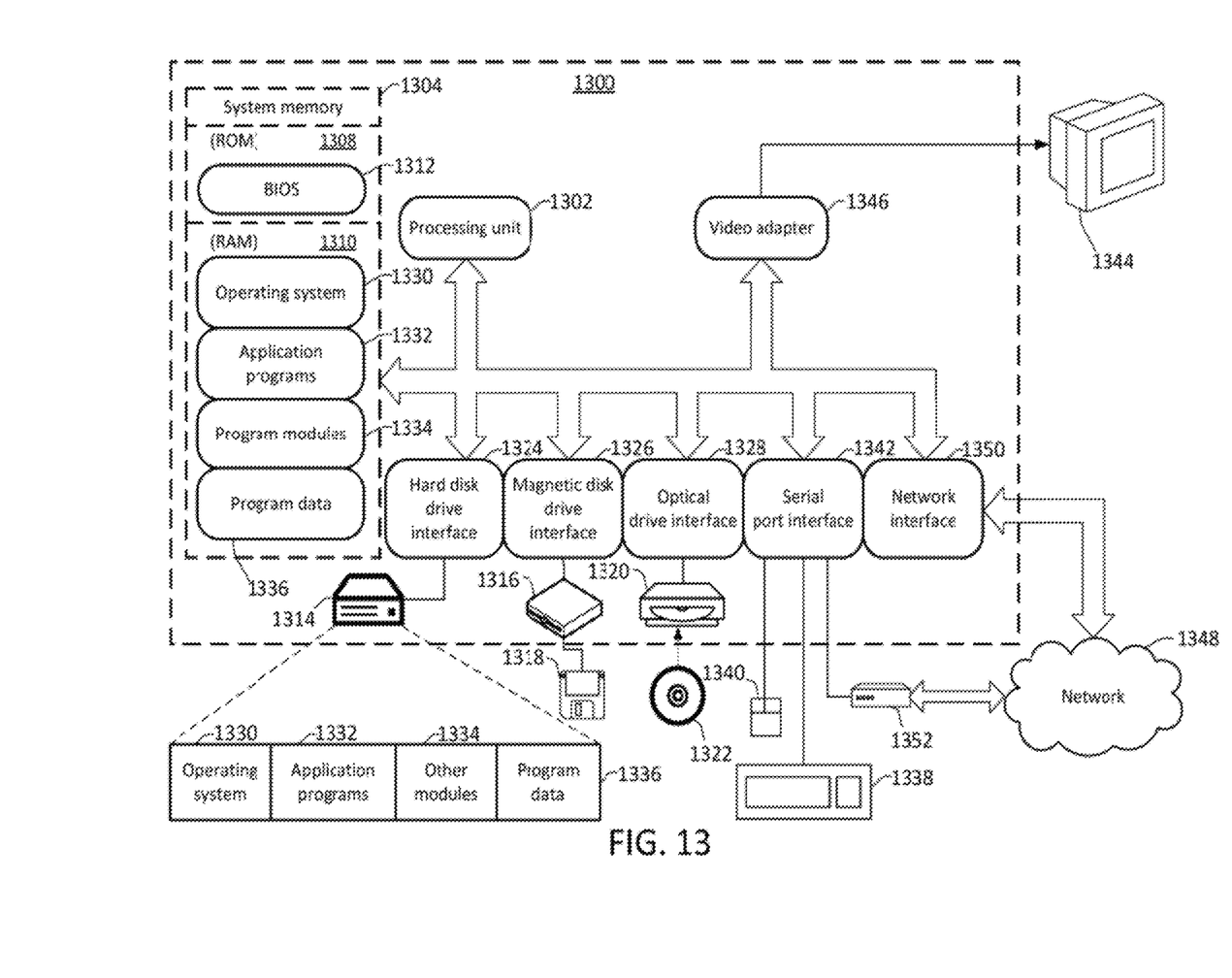
FIG. 13 depicts an example computer in which embodiments may be implemented.

FIG. 13 depicts an example computer 1300 in which embodiments may be implemented. Any one or more of the user systems 102A-102N shown in FIG. 1 (or any one or more subcomponents thereof shown in FIGS. 4 and 5) may be implemented using computer 1300, including one or more features of computer 1300 and/or alternative features. Computer 1300 may be a general-purpose computing device in the form of a conventional personal computer, a mobile computer, or a workstation, for example, or computer 1300 may be a special purpose computing device. The description of computer 1300 provided herein is provided for purposes of illustration, and is not intended to be limiting. Embodiments may be implemented in further types of computer systems, as would be known to persons skilled in the relevant art(s).

As shown in FIG. 13, computer 1300 includes a processing unit 1302, a system memory 1304, and a bus 1306 that couples various system components including system memory 1304 to processing unit 1302. Bus 1306 represents one or more of any of several types of bus structures, including a memory bus or memory controller, a peripheral bus, an accelerated graphics port, and a processor or local bus using any of a variety of bus architectures. System memory 1304 includes read only memory (ROM) 1308 and random access memory (RAM) 1310. A basic input/output system 1312 (BIOS) is stored in ROM 1308.

Computer 1300 also has one or more of the following drives: a hard disk drive 1314 for reading from and writing to a hard disk, a magnetic disk drive 1316 for reading from or writing to a removable magnetic disk 1318, and an optical disk drive 1320 for reading from or writing to a removable optical disk 1322 such as a CD ROM, DVD ROM, or other optical media. Hard disk drive 1314, magnetic disk drive 1316, and optical disk drive 1320 are connected to bus 1306 by a hard disk drive interface 1324, a magnetic disk drive interface 1326, and an optical drive interface 1328, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1330, one or more application programs 1332, other program modules 1334, and program data 1336. Application programs 1332 or program modules 1334 may include, for example, computer program logic for implementing semantic rigger module 106, mesh module 402, semantic identifier module 404, virtual rig module 406, virtual item module 410, reference element module 500, flowchart 300 (including any step of flowchart 300), flowchart 700 (including any step of flowchart 700), flowchart 800 (including any step of flowchart 800), flowchart 900 (including any step of flowchart 900), flowchart 1000 (including any step of flowchart 1000), flowchart 1100 (including any step of flowchart 1100), and/or flowchart 1200 (including any step of flowchart 1200), as described herein.

A user may enter commands and information into the computer 1300 through input devices such as keyboard 1338 and pointing device 1340. Other input devices (not shown) may include a microphone, joystick, game pad, satellite dish, scanner, or the like. These and other input devices are often connected to the processing unit 1302 through a serial port interface 1342 that is coupled to bus 1306, but may be connected by other interfaces, such as a parallel port, game port, or a universal serial bus (USB).

A display device 1344 (e.g., a monitor) is also connected to bus 1306 via an interface, such as a video adapter 1346. In addition to display device 1344, computer 1300 may include other peripheral output devices (not shown) such as speakers and printers.

Computer 1300 is connected to a network 1348 (e.g., the Internet) through a network interface or adapter 1350, a modem 1352, or other means for establishing communications over the network. Modem 1352, which may be internal or external, is connected to bus 1306 via serial port interface 1342.

As used herein, the terms "computer program medium" and "computer-readable medium" are used to generally refer to media such as the hard disk associated with hard disk drive 1314, removable magnetic disk 1318, removable optical disk 1322, as well as other media such as flash memory cards, digital video disks, random access memories (RAMs), read only memories (ROM), and the like.

As noted above, computer programs and modules (including application programs 1332 and other program modules 1334) may be stored on the hard disk, magnetic disk, optical disk, ROM, or RAM. Such computer programs may also be received via network interface 1350 or serial port interface 1342. Such computer programs, when executed or loaded by an application, enable computer 1300 to implement features of embodiments discussed herein. Accordingly, such computer programs represent controllers of the computer 1300.

Example embodiments are also directed to computer program products comprising software (e.g., computer-readable instructions) stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

III. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:

1. A method for generating a virtual rig to animate a virtual three-dimensional representation of a human face, the method comprising:
    receiving a mesh that includes a plurality of vertices to provide a virtual three-dimensional representation of a human face, the plurality of vertices defining a plurality of polygons that define a virtual three-dimensional representation of a surface of the human face;
    associating a plurality of semantic identifiers with the plurality of respective vertices, each semantic identifier specifying a respective physical feature of the human face;
    generating a virtual rig that is capable of maneuvering the mesh to a plurality of configurations, using one or more processors, based at least in part on association of the plurality of semantic identifiers with the plurality of respective vertices to animate the virtual three-dimensional representation of the human face;
    determining that a virtual item is to be combined with the mesh to represent a corresponding item of the human face based at least in part on a designated subset of the plurality of semantic identifiers; and
    generating the virtual item based at least in part on a subset of the plurality of vertices that is associated with the designated subset of the plurality of semantic identifiers and further based at least in part on whether the virtual item is a first virtual eyeball that represents a first physical eyeball of the human face or a second virtual eyeball that represents a second physical eyeball of the human face;
    wherein at least one of a position, a size, or a shape of the first virtual eyeball and a respective at least one of a position, a size, or a shape of the second virtual eyeball are asymmetric with respect to the mesh to represent that at least one of a position, a size, or a shape of the first physical eyeball and a respective at least one of a position, a size, or a shape of the second physical eyeball are asymmetric with respect to the human face; and
    wherein generating the virtual rig comprises:
        defining a reference element based at least in part on the designated subset of the plurality of semantic identifiers and further based at least in part on a thickness of a virtual layer that is coincident with an outer surface of the mesh to serve as a reference for maneuvering the virtual item, the virtual layer being a virtual representation of skin that is coincident with the surface of the human face.

2. The method of claim 1, wherein the plurality of vertices is associated with a plurality of respective vertex values;
    wherein the method further comprises:
        changing at least one vertex value of the plurality of vertex values to be at least one respective changed vertex value on which the virtual three-dimensional representation is based, based at least in part on an image of the human face, to increase accuracy of the virtual three-dimensional representation of the human face; and
    wherein generating the virtual rig comprises:
        generating the virtual rig based at least in part on the at least one changed vertex value.

3. The method of claim 2, further comprising:
    capturing the image; and
    analyzing the image to determine the at least one changed vertex value.

4. The method of claim 1, wherein defining the reference element comprises:
    defining a plurality of reference elements based on a plurality of respective subsets of the plurality of semantic identifiers, each reference element serving as a reference for maneuvering a respective portion of the mesh that corresponds to the subset on which that reference element is based.

5. The method of claim 1,
    wherein the virtual rig is capable of maneuvering the virtual item to a second plurality of configurations based on the reference element to animate the virtual three-dimensional representation of the human face.

6. The method of claim 1, wherein defining the reference element comprises:
    determining at least one of a location or a position of the reference element based at least in part on the thickness of the virtual layer.

7. The method of claim 1, wherein generating the virtual rig further comprises:
    automatically creating one or more supplementary reference elements that aid in determining at least one of a location or a position of the reference element; and
    modifying at least one of an initial location or an initial orientation of the reference element based at least in part on the one or more supplementary reference elements to provide at least one of a revised location or a revised orientation of the reference element.

8. A system for generating a virtual rig to animate a virtual three-dimensional representation of a human face, the system comprising:

at least one element including at least one of (a) one or more processors or (b) hardware logic/electrical circuitry;
a semantic identifier module, implemented using the at least one element, configured to associate a plurality of semantic identifiers with a plurality of respective vertices of a mesh that provides a virtual three-dimensional representation of a human face, the plurality of vertices defining a plurality of polygons that define a virtual three-dimensional representation of a surface of the human face, each semantic identifier specifying a respective physical feature of the human face;
a virtual rig module, implemented using the at least one element, configured to generate a virtual rig that is capable of maneuvering the mesh to a plurality of configurations based at least in part on association of the plurality of semantic identifiers with the plurality of respective vertices to animate the virtual three-dimensional representation of the human face; and
a virtual item module, implemented using the at least one element, configured to determine that a virtual item is to be combined with the mesh to represent a corresponding item of the human face based at least in part on a designated subset of the plurality of semantic identifiers, the virtual item module further configured to generate the virtual item based at least in part on a subset of the plurality of vertices that is associated with the designated subset of the plurality of semantic identifiers and further based at least in part on whether the virtual item is a first virtual eyeball that represents a first physical eyeball of the human face or a second virtual eyeball that represents a second physical eyeball of the human face;
wherein at least one of a position, a size, or a shape of the first virtual eyeball and a respective at least one of a position, a size, or a shape of the second virtual eyeball are asymmetric with respect to the mesh to represent that at least one of a position, a size, or a shape of the first physical eyeball and a respective at least one of a position, a size, or a shape of the second physical eyeball are asymmetric with respect to the human face;
wherein the virtual rig module comprises:
a reference element module, implemented using the at least one element, configured to define a reference element based at least in part on the designated subset of the plurality of semantic identifiers and further based at least in part on a thickness of a virtual layer that is coincident with an outer surface of the mesh to serve as a reference for maneuvering the virtual item; and
wherein the virtual layer is a virtual representation of skin that is coincident with the surface of the human face.

9. The system of claim 8, wherein the plurality of vertices is associated with a plurality of respective vertex values;
wherein the system further comprises:
a mesh module, implemented using the at least one element, configured to change at least one vertex value of the plurality of vertex values to be at least one respective changed vertex value on which the virtual three-dimensional representation of the human face is based, based at least in part on an image of the human face, to increase accuracy of the virtual three-dimensional representation of the human face; and
wherein the virtual rig module is configured to generate the virtual rig based at least in part on the at least one changed vertex value.

10. The system of claim 8,
wherein the virtual rig is further configured to maneuver the virtual item to a second plurality of configurations based at least in part on the reference element to animate the virtual three-dimensional representation of the object.

11. The system of claim 8, wherein the reference element module is configured to determine at least one of a location or a position of the reference element based at least in part on the thickness of the virtual layer.

12. The system of claim 8, wherein the reference element module is configured to define a plurality of reference elements based on a plurality of respective subsets of the plurality of semantic identifiers, each reference element serving as a reference for maneuvering a respective portion of the mesh that corresponds to the subset on which that reference element is based.

13. The system of claim 8, wherein the virtual rig module is configured to create one or more supplementary reference elements to aid in a determination of at least one of a location or a position of the reference element; and
wherein the virtual rig module is configured to modify at least one of an initial location or an initial orientation of the reference element based at least in part on the one or more supplementary reference elements to provide at least one of a revised location or a revised orientation of the reference element.

14. The system of claim 9, further comprising:
a camera to capture the image; and
a mesh module, implemented using the at least one element, configured to analyze the image to determine the at least one changed vertex value.

15. The system of claim 13, wherein the virtual rig module is configured to automatically create the one or more supplementary reference elements.

16. A computer program product comprising a computer-readable medium, which is not a signal, having instructions recorded thereon for enabling a processor-based system to generate a virtual rig to animate a virtual three-dimensional representation of a human head, the instructions comprising:
first instructions for enabling the processor-based system to associate a plurality of semantic identifiers with a plurality of respective vertices of a mesh that provides a virtual three-dimensional representation of a human head, the plurality of vertices defining a plurality of polygons that define a virtual three-dimensional representation of a face of the human head, each semantic identifier specifying a respective feature of the human head;
second instructions for enabling the processor-based system to generate a virtual rig that is capable of maneuvering the mesh to a plurality of configurations based at least in part on association of the plurality of semantic identifiers with the plurality of respective vertices to animate the virtual three-dimensional representation of the human head;
third instructions for enabling the processor-based system to determine that first and second virtual eyeballs are to be combined with the mesh to represent corresponding first and second physical eyeballs of the human head based at least in part on respective first and second designated subsets of the plurality of semantic identifiers; and
fourth instructions for enabling the processor-based system to generate the first and second virtual eyeballs based at least in part on respective first and second subsets of the plurality of vertices that are associated with the respective first and second designated subsets of the plurality of semantic identifiers;

wherein at least one of a position, a size, or a shape of the first virtual eyeball and a respective at least one of a position, a size, or a shape of the second virtual eyeball are asymmetric with respect to the mesh to represent that at least one of a position, a size, or a shape of the first physical eyeball and a respective at least one of a position, a size, or a shape of the second physical eyeball are asymmetric with respect to the human face; and wherein the second instructions comprise:

instructions for enabling the processor-based system to define respective first and second reference elements based at least in part on the respective first and second designated subsets of the plurality of semantic identifiers and further based at least in part on a thickness of a virtual layer that is coincident with an outer surface of the mesh to serve as references for maneuvering the respective first and second virtual eyeballs, wherein the virtual layer is a virtual representation of skin that is coincident with the surface of the human head.

17. The computer program product of claim 16, wherein the plurality of vertices is associated with a plurality of respective vertex values;

wherein the instructions further comprise:

fifth instructions for enabling the processor-based system to change at least one vertex value of the plurality of vertex values to be at least one respective changed vertex value on which the virtual three-dimensional representation of the human head is based, based at least in part on an image of the human head, to increase accuracy of the virtual three-dimensional representation of the human head; and wherein the second instructions include instructions for enabling the processor-based system to generate the virtual rig based at least in part on the at least one changed vertex value.

18. The computer program product of claim 16, wherein the instructions further comprise:

fifth instructions for enabling the processor-based system to maneuver the first and second virtual eyeballs to respective configurations based at least in part on the respective first and second reference elements.

19. The computer program product of claim 16, wherein the fifth instructions comprise:

instructions for enabling the processor-based system to determine at least one of a location or a position of at least one of the first reference element or the second reference element based at least in part on the thickness of the virtual layer.

20. The computer program product of claim 17, further comprising:

sixth instructions for enabling the processor-based system to capture the image; and seventh instructions for enabling the processor-based system to analyze the image to determine the at least one changed vertex value.

* * * * *